United States Patent [19]

Ueyama et al.

[11] 4,095,080
[45] June 13, 1978

[54] METHOD FOR MEASURING THE EXTENT OF SHIELDING FUNCTION OF AN ARC ATMOSPHERE AND AN ARC WELDING MACHINE INCLUDING A NITROGEN OXIDE MEASURING DEVICE MEASURING THE EXTENT OF SHIELDING FUNCTION

[75] Inventors: Fumio Ueyama, Nara; Takao Yoshimitsu, Kobe, both of Japan

[73] Assignee: Osaka Denki Co., Ltd., Osaka, Japan

[21] Appl. No.: 647,180

[22] Filed: Jan. 7, 1976

[51] Int. Cl.² .............................................. B23K 9/16
[52] U.S. Cl. ................................ 219/74; 219/137.41; 356/36
[58] Field of Search ....................... 219/70, 72, 74, 75, 219/125, 131 R, 137 PS; 356/36

[56] References Cited

U.S. PATENT DOCUMENTS

| 3,432,637 | 3/1969 | Witting | 219/74 |
|---|---|---|---|
| 3,524,038 | 8/1970 | O'Kelly, Jr. | 219/70 |
| 3,562,581 | 2/1971 | Sonju | 219/131 |
| 3,791,743 | 2/1974 | Cody et al. | 356/36 X |

FOREIGN PATENT DOCUMENTS

| 1,219,865 | 1/1971 | United Kingdom | 219/137 PS |
|---|---|---|---|
| 1,294,135 | 10/1972 | United Kingdom | 219/131 R |
| 187,905 | 12/1966 | U.S.S.R. | 219/74 |
| 200,687 | 10/1967 | U.S.S.R. | 219/131 R |
| 231,686 | 4/1969 | U.S.S.R. | 219/131 R |
| 278,923 | 11/1970 | U.S.S.R. | 219/125 R |

*Primary Examiner*—Bruce A. Reynolds
*Assistant Examiner*—N. D. Herkamp
*Attorney, Agent, or Firm*—Flynn & Frishauf

[57] ABSTRACT

The extent of shielding function of an arc atmosphere is measured by the concentration of nitrogen oxide in the arc atmosphere. The concentration of nitrogen oxide in the arc atmosphere is measured by a nitrogen oxide measuring device. The measured value is indicated by an indicator. When the measured value exceeds a predetermined reference value, an alarm device is operated or a welding operation is stopped. Either a supply of shielding gas which forms an arc atmosphere is controlled, or a flow of fume is controlled through a fume exhaust device, as a function of the measured value.

10 Claims, 9 Drawing Figures

METHOD FOR MEASURING THE EXTENT OF SHIELDING FUNCTION OF AN ARC ATMOSPHERE AND AN ARC WELDING MACHINE INCLUDING A NITROGEN OXIDE MEASURING DEVICE MEASURING THE EXTENT OF SHIELDING FUNCTION

This invention relates to a method for measuring the extent of shielding function of an arc atmosphere and an arc welding machine, in particular an arc welding machine for performing a welding by enclosing an arc and molten pool by an arc atmosphere so as to shield them from the other atmosphere.

A consumable wire electrode or non-consumable electrode is disposed opposite to a mother metal and an electric current from an arc welding machine is supplied therebetween to generate an arc for welding. Where the consumable wire electrode is used, it is fused by an arc heat. Where, on the other hand, the non-consumable electrode is used, a welding wire is fused by an arc heat. A molten pool is formed in the mother metal and a fused metal from the wire is given dropwise to the molten pool while it is shifted. The fused metal given to the molten pool while being shifted is solidified to form a deposited metal, for example, a bead. When an arc is generated in the outer atmosphere, a great amount of nitrogen oxide dissociated by a high arc heat is present in the arc. In this case, therefore, the deposited metal absorbs oxygen and nitrogen in a greater amounts. The oxygen and nitrogen absorbed in the deposited metal are gasfied and partially remains there when the deposited metal is solidified For this reason, voids or pores are prominently developed and the mechanical properties of the deposited metal are deteriorated. Where arc welding is effected in the outer atmosphere, therefore, it is commonly practiced to create an arc atmosphere for shielding an arc and molten pool from the surrounding outer atmosphere. In a gas shielded are welding, for example, a shielding gas such as argon gas, helium gas etc. is continuously supplied from a gas nozzle to always create an arc shielding atmosphere around the arc so that the arc and molten pool can be shielded from the outer atmosphere. However, there has not yet been established any method for measuring in a quantitative way the extent of shielding an arc and molten pool from the outer atmospheres. In an actual arc welding, for example, a gas shielded arc welding, the operator controls a supply of shielding gas experimentally, or based on an instruction of a manual, so that a suitable arc shielding atmosphere can be created. The extent to which an arc and molten pool are shielded from the outer atmosphere is varied dependent upon a flow of shielding gas and the state of a stream of shielding gas. If, for example, the shape of a mother metal, kind of welded joint, the state of an included angle, a distance between the gas nozzle and the mother metal are changed, the state of a stream of shielding gas is varied with the result that the extent of the arc shielding atmosphere is correspondingly varied. In the actual arc welding, there often occurs the case where during the progress of the arc welding the extent of shielding function of an arc atmosphere is departed from a suitable level. The departure of the extent of shielding function of an arc atmosphere from a proper level causes variation of, for example, the state of a deposited metal, arc sound, the generating state of spatter and the melting state of a wire electrode. Where arc welding is effected by a semiautomatic arc welding machine in the neighborhood of arc, the operator can observe such a variation.

Even when adjustment can be made to attain a proper arc shielding function, a deposited metal suffers a certain amount of defects until such an adjustment is completed. Where, as in the case of an automatic arc welding, an arc welding is remotely controlled by observing an welding current, arc voltage etc. through the corresponding indicator, it is impossible to observe the departure of the extent of shielding function of an arc atmosphere from the proper level. In this case, the welding is continued in such an unsuitable way with the result that the deposited metal suffers a greater amount of defects. In the arc welding, fume is evolved during the welding operation, thus preventing further progress of the welding operation. As a settlement to this problem is provided a fume exhaust device adapted to such a welding fume from a suction nozzle mounted in the neighborhood of an arc and exhausting it outside the welding workshop. When the fume exhaust device is so provided, an arc shielding atmosphere is also sucked together with the welding fume to cause the arc shielding atmosphere to be disturbed. As a result, the function of shielding an arc and molten pool from the outer atmosphere is lowered. Where the fume exhaust device is provided in performing, for example, a gas shielded arc welding, a supply of shielding gas is determined taking into consideration a flow of shielding gas exhausted from the fume exhaust device. Since a flow of shielding gas is varied due to a spatter deposited onto the gas nozzle, the extent of shielding function of an arc atmosphere is lowered during the welding operation, offering the problem of forming a defective deposited metal. Since the arc shielding atmosphere is present around the arc of high heat, when the extent of shielding function of an arc atmosphere is lowered, some of the outer atmosphere is mixed in the arc shielding atmosphere and nitrogen oxide $NO_x$ is produced by the arc heat. If, therefore, the concentration of $NO_x$ in the arc atmosphere is measured, the extent of shielding function of an arc atmosphere, i.e., the extent to which some of the outer atmosphere is mixed in an arc shielding atmosphere, will be able to be measured. Recently, $NO_x$ in the exhaust gas of an automobile etc. presents an air pollution problem and a nitrogen oxide measuring apparatus is developed for measuring the concentration of $NO_x$ in the exhaust gas. At present, it is possible to easily obtain such a measuring apparatus which is compact in design, high in reliability and easy to handle. With these in mind, various experiments were conducted in connection with a gas shielded arc welding.

Experiment 1

The phenomenon that the extent of shielding function of an arc atmosphere is lowered due to a spatter deposited onto a gas nozzle was reproduced by artificially varying a supply of shielding gas. At this time, the concentration of $NO_x$ in the arc shielding atmosphere was measured and recorded, while the result of the welding was also examined. A wire electrode (1.2 mm $\phi$) was used and a $CO_2$ gas was used as a shielding gas. At a welding current of 300 A, a welding voltage of 28V and a welding speed of 25 cm/min. a supply of shielding gas was varied in a range of 0 to 30 l/min. The result of the experiment is shown in FIG. 1. As will be evident from FIG. 1, when a flow of shielding gas exceeds a level $Q_a$, the concentration of $NO_x$ takes a lower level $M_{a1}$ and is maintained substantially constant. This means that the outer atmosphere is positively prevented from entering into the central area of the arc atmosphere as well as into the high temperature area surrounding the central area of the arc atmosphere. When a flow of shielding gas is in a range of below the level $Q_a$ but above the level $Q_c$, the concentration of $NO_x$ is gradually increased from the level $M_{a1}$ to a level $M_{c1}$ as a flow of shielding gas is decreased. However, the result of welding was good. This means that the extent of shielding function of an arc atmosphere is decreased as some of the outer atmosphere increasingly enters into the high temperature area of the arc shielding atmosphere, but that the extent of the shielding function of an arc atmosphere is maintained to the extent that the deposited metal suffers no defect such as voids etc. When, however, a flow of shielding gas is less than the level $Q_c$, the concentration of $NO_x$ is rapidly increased to above the level $M_{c1}$ and the deposited metal suffered defects. This means that the extent of the shielding function of an arc atmosphere is greatly lowered and that some of the outer atmosphere enters, beyond the high temperature area of the arc shielding atmosphere where $NO_x$ is produced, into the central area of the arc shielding atmosphere where the deposited metal suffers defects.

Experiment 2

The phenomenon that the extent of shielding function of an arc atmosphere is lowered due to a variation in the shape of a mother metal and the state of included angle and due to a variation in a distance between a gas nozzle and a mother metal was reproduced by artificially varying the distance between the gas nozzle and the mother metal. At this time, the concentration of nitrogen oxide in the arc atmosphere was measured and recorded, while the result of the welding was examined. This Experiment was conducted under the same condition as in Experiment 1, except that a flow of shielding gas was set at 20 l/min and that the length of a wire extension was varied in a range of 0 to 50 mm. The length of the wire extension was so varied, because use was made of a welding torch in which a gas nozzle is mounted coaxial with an electrode tip. The result of the experiment is shown in FIG. 2. When the length of the wire extension is below a level $L_a$, the concentration of $NO_x$ has a low value of below a level $M_{a2}$ and is substantially constant and the result of welding was good. This means that the outer atmosphere is positively prevented from entering into the central area of an arc shielding atmosphere as well as into a high temperature area surrounding the central area of the arc shielding atmosphere. When the length of the wire extension is in a range of above the level $L_a$ but below a level $L_c$, the density of $NO_x$ is gradually increased from the level $M_{a2}$ to a level $M_{c2}$, as the length of the wire extension is increased. In this case, the result of welding was good. This means that the extent of shielding function of an arc atmosphere is lowered as the length of the wire extension is increased, but that although the outer atmosphere enters into a high temperature area of the arc shielding atmosphere, the function of the arc shielding atmosphere is maintained to the extent that the deposited metal suffers no defect such as voids. When, however the length of the wire extension exceeds the level $L_c$, the density of $NO_x$ is rapidly increased to above the level $M_{c2}$ and the deposited metal suffers defects. This means that the extent of shielding function of an arc atmosphere is prominently lowered, since some of the outer atmosphere enters into the central area of the arc shielding atmosphere as well as into the high temperature area surrounding the central area of the arc shielding atmosphere.

Experiment 3

The phenomenon that the extent of shielding function of an arc atmosphere is lowered due to a spatter deposited onto a gas nozzle was reproduced by artificially depositing a spatter onto the nozzle and varying a flow of shielding gas as in Experiment 1. The density of $NO_x$ in the arc shielding atmosphere was measured and recorded, while the result of the welding was examined. The result of the experiment is compared, as shown in FIG. 3, with that of Experiment 1. In FIG. 3, a solid line I shows the result of Experiment 1 while a solid line II shows the result of Experiment 3. Where a spatter is deposited onto the gas nozzle, even if a flow of shielding gas is identical, the extent of shielding function of an arc atmosphere is greatly lowered as compared with the case where no spatter is deposited onto the gas nozzle. Although a flow of shielding gas differs greatly at the time when the deposited metal suffers defects, the density of $NO_x$ in the arc shielding atmosphere when the deposited metal is subject to defects is found to have substantially the same value.

Experiment 4

The phenomenon that the extent of shielding function of an arc atmosphere is lowered by sucking a welding fume through a fume exhaust device was reproduced by artificially varying a flow of welding fume. The density of $NO_x$ in the arc shielding atmosphere was measured and recorded while the result of the welding was examined. In this case, a flow of shielding gas was varied stepwise. The result of Experiment was indicated by solid lines A, B and C in FIG. 4. As will be evident from FIG. 4, when the flow of welding fume is increased through the fume exhaust device, the extent of shielding function of an arc atmosphere is correspondingly lowered with the result that the deposited metal undergoes defects. It is seen that, when a lesser supply of shielding gas is involved, the deposited metal undergoes defects with a lesser flow of fume exhausted. When the function of an arc shielding atmosphere is lowered irrespective of the flow of shielding gas to the extent that the deposited metal suffers defects, the concentration of $NO_x$ in the arc shielding atmosphere is found to have substantially the same value.

From the above-mentioned Experiments the following conclusion was reached. The extent of shielding function of an arc atmosphere, though varied by the flow of the shielding gas, length of the wire extension etc., cannot be measured thereby. The concentration of $NO_x$ in the arc shielding atmosphere has a correlation to the extent of shielding function of an arc atmosphere.

An object of this invention is to provide a method for measuring in a quantitative way the extent of shielding function of an arc atmosphere.

Another object of this invention is to provide an arc welding machine capable of monitoring, during the welding operation, the extent of shielding function of an arc atmosphere through an indicator.

Still another object of this invention is to provide an arc welding machine capable of recording during the welding operation the extent of shielding function of an arc atmosphere and evaluating it, after the completion of the welding, for the welding operation and the quality of a deposited metal.

A further object of this invention is to provide an arc welding machine capable of informing the operator of the state involved when and before an arc shielding function is lowered to an extent that a deposited metal suffers defects.

A still further object of this invention is to provide an arc welding machine capable of automatically maintaining the extent of shielding function of an arc atmosphere to a proper level.

Other objects and advantages of this invention will become apparent from the following detailed description when considered in conjunction with the accompanying drawings.

DETAILED DESCRIPTION

Figure 1:
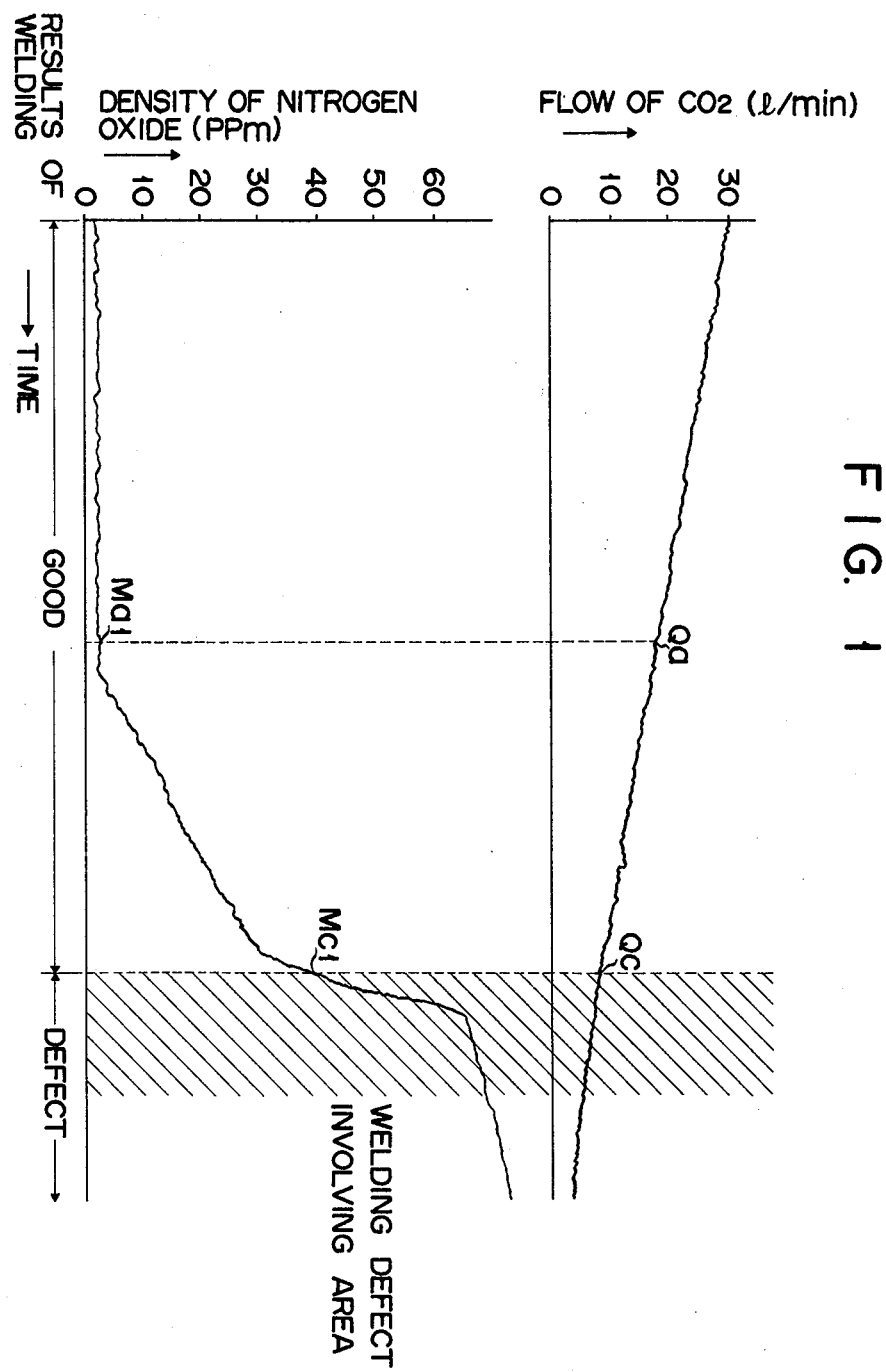
FIG. 1 is a graph showing a variation in the concentration of nitrogen oxide in an arc atmosphere when a flow of shielding gas, forming an arc atmosphere, is varied during the welding operation.
Figure 2:
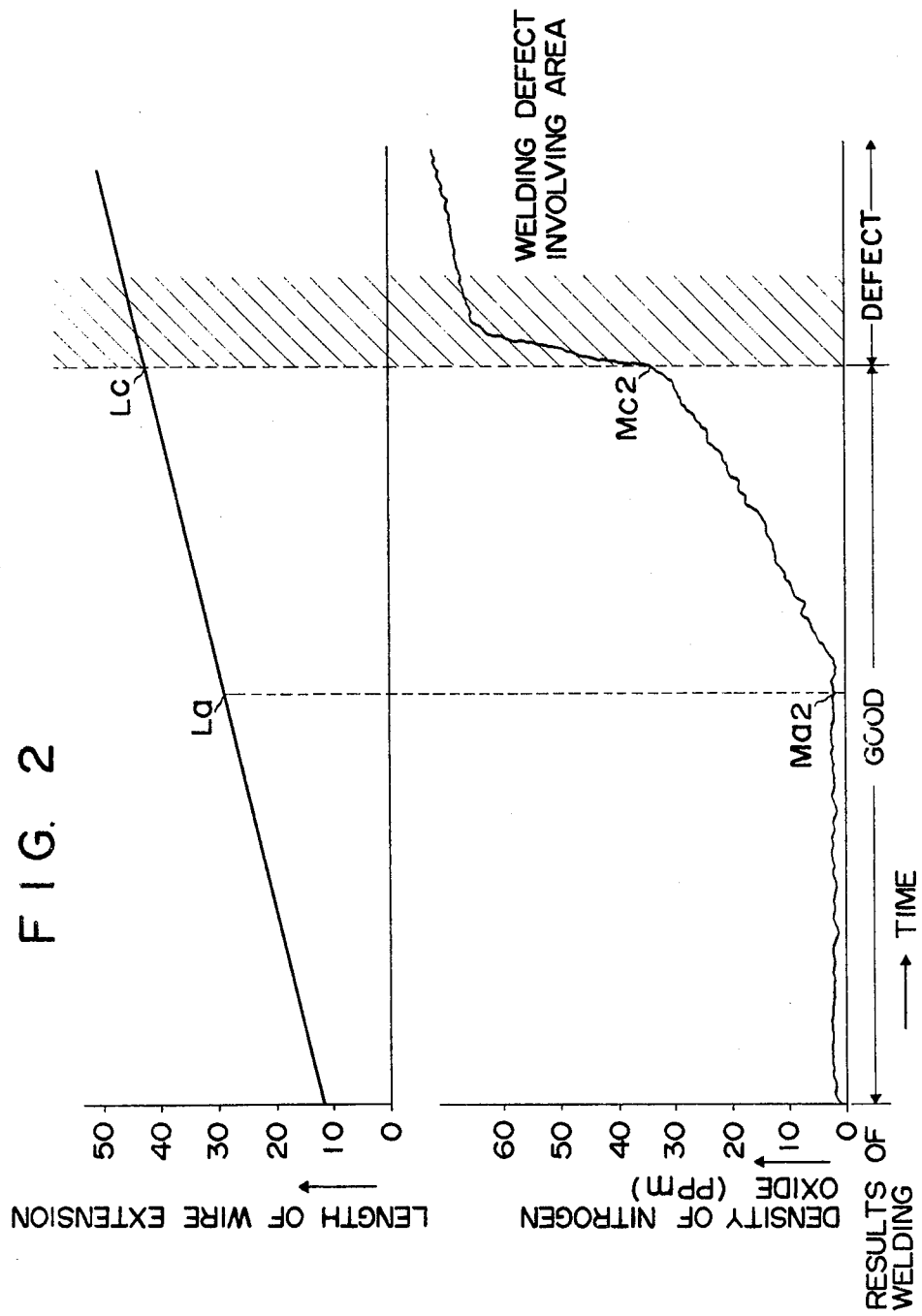
FIG. 2 is a graph showing a variation in the concentration of nitrogen oxide in an arc atmosphere when the length of wire extension is varied during the welding operation.
Figure 3:
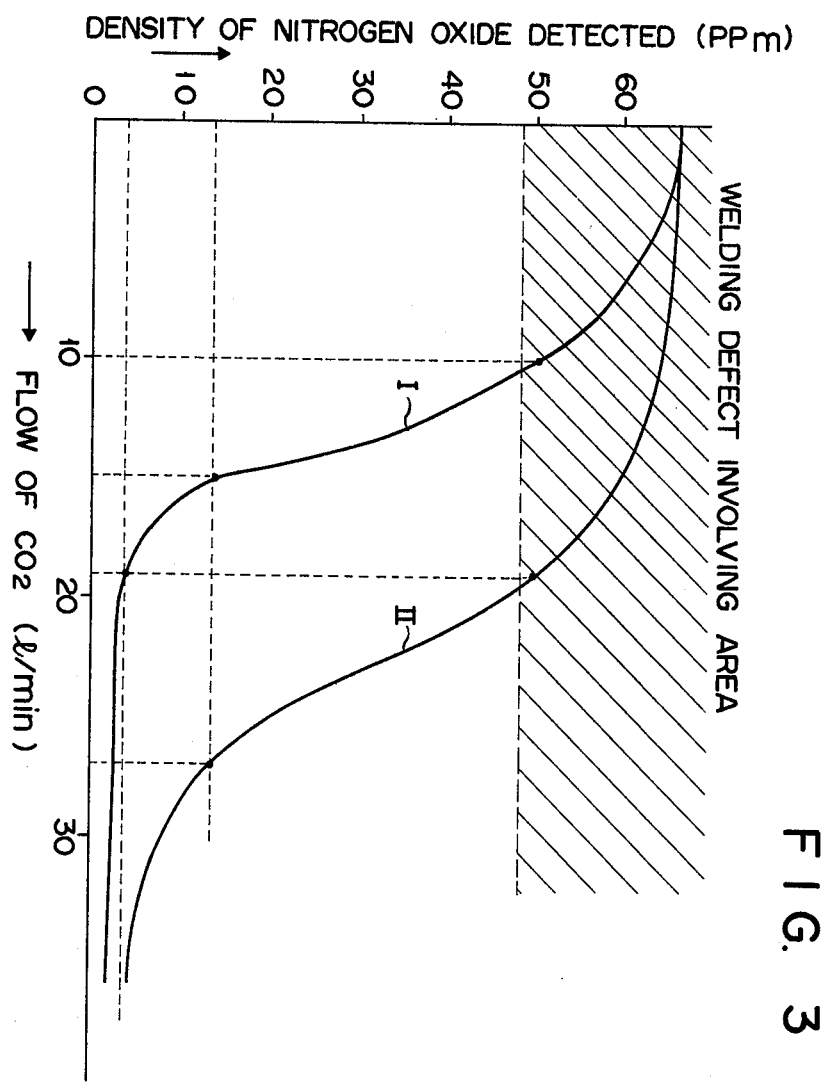
FIG. 3 is a graph showing the fact that the concentration of nitrogen oxide in an arc atmosphere is varied due to a variation in a flow of shielding gas as well as a spatter deposited onto a gas nozzle.
Figure 4:
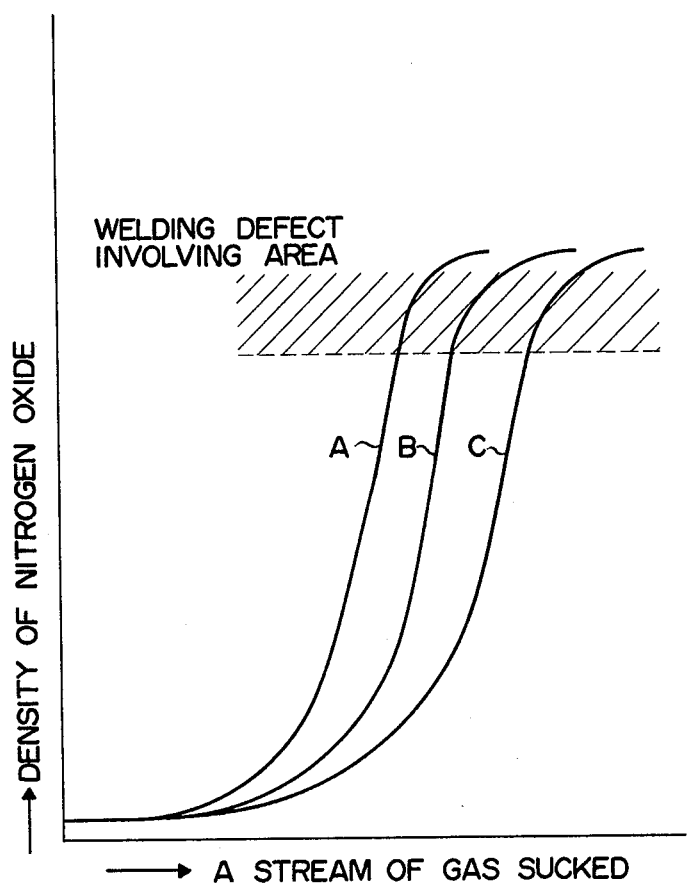
FIG. 4 is a graph showing a variation in the concentration of nitrogen oxide in an arc atmosphere when a flow of exhaust fume is varied through a fume exhaust device.
Figure 5:
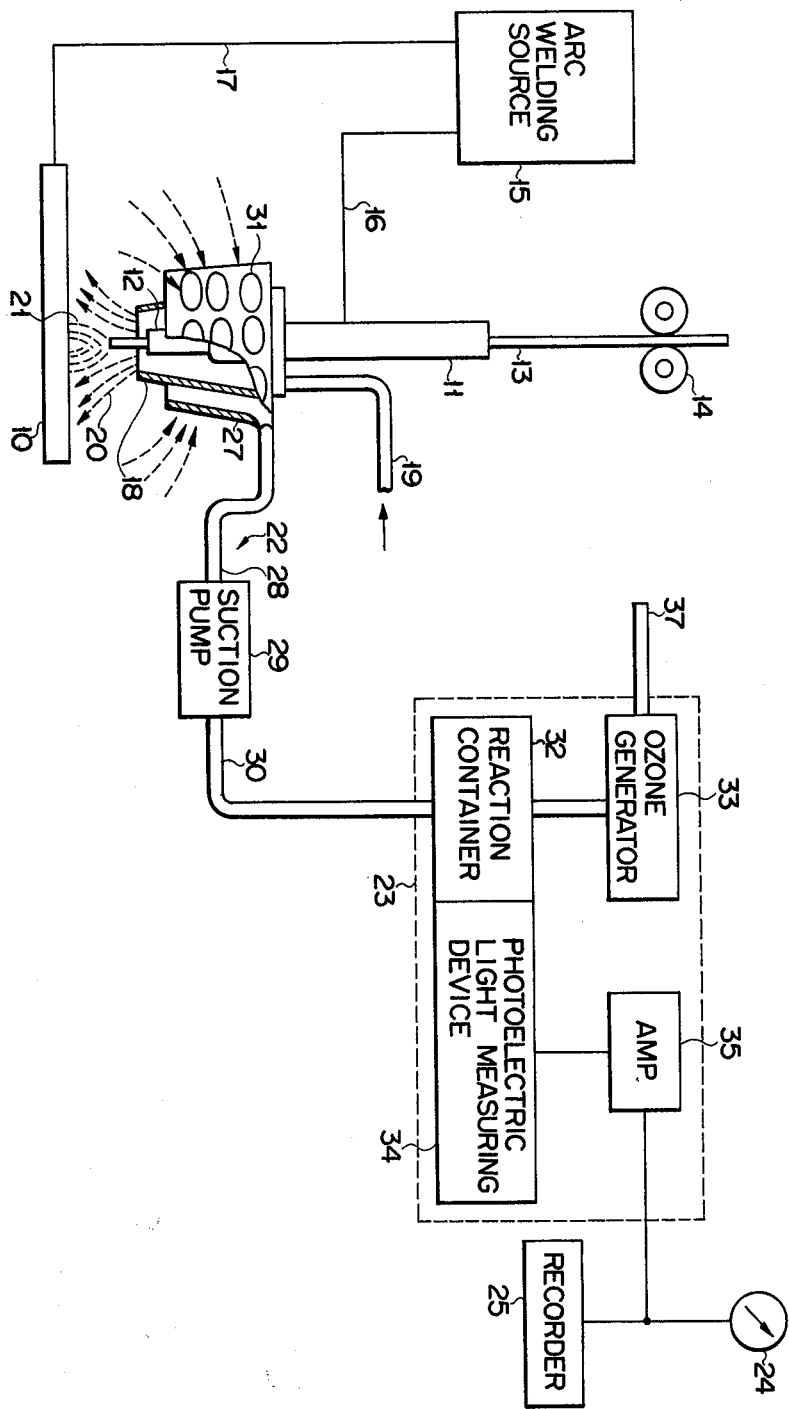
FIGS. 5 and 6, each are a block diagram showing an arc welding machine, according to this invention, which is capable of instructing, informing and recording the extent of shielding function of an arc atmosphere.

In FIG. 5, a welding torch 11 is disposed above a mother metal 10 in the outer atmosphere with an electrical power supply tip 12 on the forward end of the welding torch 11 being directed toward the mother metal 10. The wire electrode 13 is fed, by the wire feeding device 14, through the welding torch 11 toward the mother metal 10. The ground terminal of the arc welding source 15 is connected through a ground side cable 17 to the mother metal 10 and the electrical power feeding terminal of an arc welding power source 15 is connected through a power supply side cable 16 and the electric power supply tip 12 of the welding torch 11 to the wire electrode 13. A cylindrical gas nozzle 18 is mounted on the forward end of the welding torch 11 and around the outer periphery of the electrode tip 12 with a gas outlet of the gas nozzle 18 directed toward the mother metal 10. The gas nozzle 18 is connected through a pipe 19 and a manually operated gas flow adjuster, not shown, to a gas source (not shown) such as a shielding gas bomb.

A gas shielded arc welding is effected by manually operating the gas flow adjuster to supply a predetermined amount of shielding gas 20 from the gas nozzle 18 and supplying an electric power from the arc welding electrode 15 to the wire electrode 13 to generate an arc between the mother metal 10 and the electrode projecting from the power supply chip 12 while continuously feeding the wire electrode 13 at a predetermined feed rate by the wire feeding device 14. In such a gas shielded arc welding, a shielding gas from the gas nozzle 18 is always present around an arc 21 and an arc atmosphere is created by the shielding gas 20 around the arc 21.

The so created gas atmosphere is collected at a gas collection device 22 and sent to a nitrogen oxide measuring device 23. The output of the nitrogen oxide measuring device 23 is sent to an indicator 24 and a recorder 25.

The gas collection device 22 is so arranged that a gas collection nozzle 27 is connected through a pipe 28 to a suction port of a suction pump 29 and an exhaust port of the suction pump 29 is connected through a pipe 30 to a gas inlet of the nitrogen oxide measuring device 23. The gas collection nozzle 27 is cylindrical in configuration and has a number of suction holes 31 at the outer peripheral wall thereof. The gas collection nozzle 27 is mounted coaxial with the gas nozzle 18 around the outer periphery of the gas nozzle 18 with a gas collection hole directed toward the mother metal.

The nitrogen oxide measuring device 23 comprises a reaction container 32, an ozone generator 33, a photoelectric light measuring device 34 and an amplifier 35. The ozone generator 33 is adapted to admit an outer tmosphere from an inlet 37 to generate ozone. The reaction container 32 is adapted to react under reduced pressure a collection gas collection device 22 sith ozone from the ozone generator 33. The photoelectric light measuring device 34 is adapted to detect through a built in optical filter, by a photoelectric multiplier, an infrared ray of a wavelength of 600 to 2500 mm radiated with a light emitting intensity proportional to a mass flow rate of NO, when NO in the collection gas is reacted with ozone at the reaction container 32, so as to convert the reacted NO into an electric amount. The amplifier 35 is adapted to amplify the output of the photoelectric multiplier in the photoelectric light emitting device 34. The indicator 24 indicates to the operator an electric signal generated from the nitrogen oxide measuring device. The recorder is adapted to record an electric signal from the nitrogen oxide measuring device 23 onto a recording medium such as a recording paper.

When a gas shielded arc welding machine is carried out, if the gas collection device 22 and nitrogen oxide measuring device 23 are operated, the shielding gas 20 creating a gas shielding atmosphere is collected through the gas collection nozzle 27 when the gas collection device 22 is passed around the arc 21. In consequence, the arc atmosphere is continuously collected through the gas collection device 22 and sent to the nitrogen oxide measuring device 23. The nitrogen oxide measuring device 23 measures the concentration of nitrogen oxide (NO) in the arc atmosphere and generates a measured value as an electric signal. The electric signal of the nitrogen oxide measuring device is coupled to the indicator 24 for instruction to the operator and also to the recorder 25 so that it can be recorded on the recording medium.

The operator is instructed during the welding operation by the indicator 24 and can monitor the concentration, and its variation, of nitrogen oxide in the arc atmosphere. Since the concentration of nitrogen oxide in the arc atmosphere has a correlation to the extend of shielding function of the arc atmosphere and the extend of shielding function of the arc atmosphere is indicated, the operator can monitor through the indicator 24 the extent, and its variation, of shielding function of the arc atmosphere. If the welding operation is effected according to the instruction from the indicator 24, for example, by operating the gas flow adjustor so that the extend of shielding function of the arc atmosphere is maintained to a proper level, it is possible to prevent an improper welding operation which causes a defective deposited metal, as well as to prevent any excess consumption of shielding gas. Examination of the measured value recorded onto the recording medium indicates whether or not the extend of shielding function of the arc atmosphere is maintained to a proper level and gives a welding assessment basis to the operator as well as a quality evaluation basis as to whether or not the deposited metal suffers defects.

Figure 6:
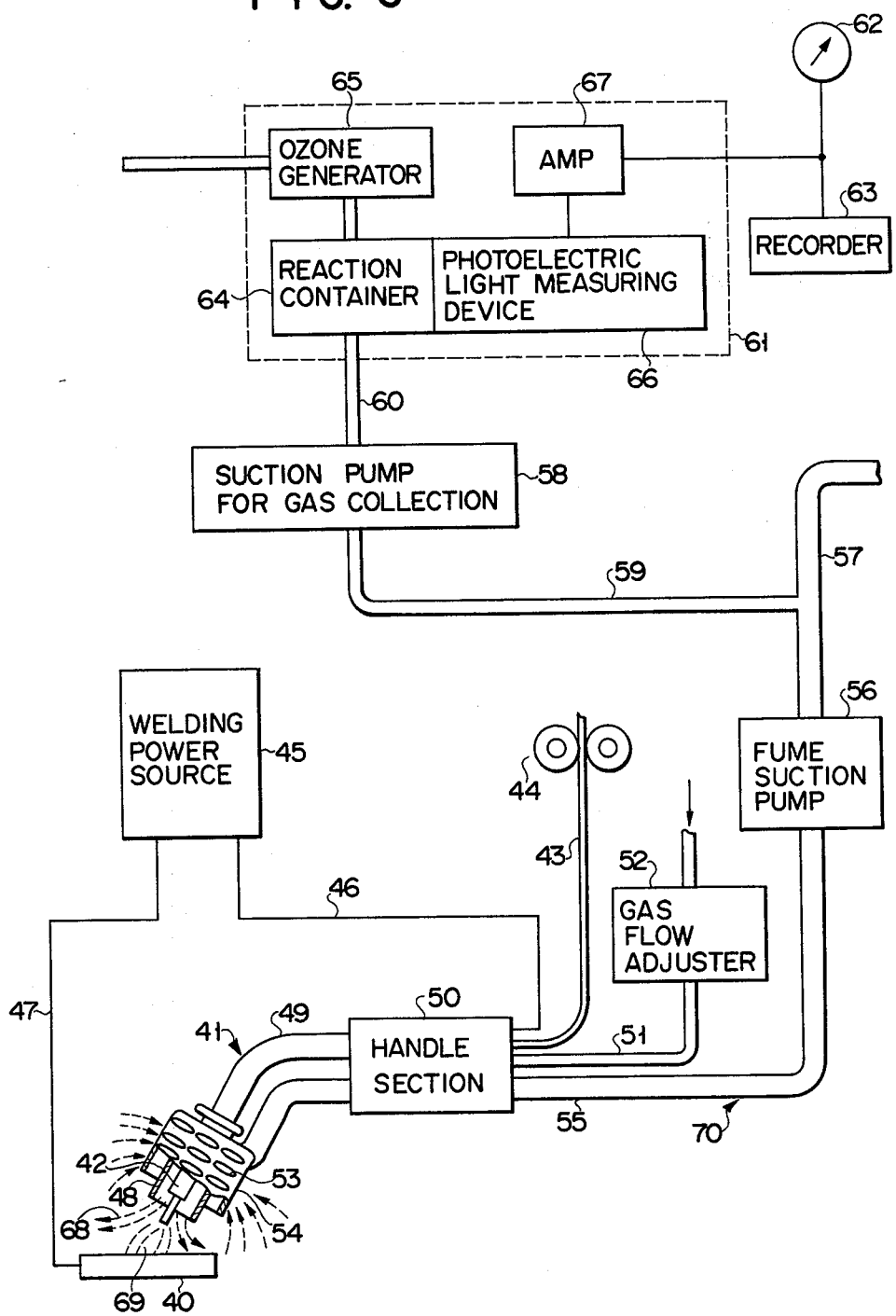

FIG. 6 shows another embodiment. In FIG. 6 a welding torch 41 is disposed, above a mother metal 40 exposed to the outer atmosphere, with an electric power supply tip 42 on the forward end of the welding torch 41 being directed toward the mother metal 40. A wire electrode 43 is supplied, by a wire supply device 44, through the welding torch 41 toward the mother metal 40. The ground terminal of an arc welding power source 45 is connected through a ground side cable 47 to the mother metal 40 and the power supply terminal of the arc welding power source 45 is connected to the wire electrode 43 through a power supply side cable 46 and power supply chip 42 of the welding torch 41. A cylindrical gas nozzle 48 is mounted on the forward end of the welding torch 41 and in a coaxial relation to the electrode chip 42 with the gas outlet directed toward the mother metal. The gas nozzle 48 is connected to a wire feed conduit 49 of the welding torch 41 and to a gas source (not shown) such as a gas bomb through a handle section 50, pipe 51 and a manually operated gas flow adjuster 52. A cylindrical fume suction nozzle 54 with a number of fume suction holes 53 around the outer peripehry thereof is mounted on the gas nozzle 48 and in a coaxial relation to the outer periphery of the gas nozzle 48 with the fume suction nozzle direction toward the mother metal 40. The fume suction nozzle 54 is connected to the suction inlet of an exhaust fume suction pump 56 through the handle section through which a pipe 55 extends. An exhaust outlet of the suction pump 56 is connected to one end of a pipe 57. The outer end of the pipe 57 extends outside of the welding workshop. The exhaust fume suction pump 56 has a fume collection filter at the suction side thereof. The suction inlet of a suction pump 58 for gas collection is connected through a pipe 59 to a location portway of the pipe 57. The exhaust outlet of the suction pump 58 is connected through a pipe 60 to the gas inlet of a nitrogen oxide measuring device 61. The output of the nitrogen oxide measuring device 61 is coupled to an indicator 62 and recorder 63. The nitrogen oxide measuring device 61 is of the same type as shown in FIG. 5 and comprises a reaction container 64, an ozone generator 65, a photoelectric light measuring device 66 and an amplifier 67.

A gas shielded arc welding is carried out by manually operating the gas flow adjuster 52 to supply a predetermined amount of shielding gas 68 from a gas nozzle 48 and supplying an electric power to the wire electrode 43 to generate an arc between the mother metal 40 and the wire electrode 13 projecting from the power supply tip 42 while continually supplying a wire electrode 43 at a predetermined feed rate from a wire feed device 44. In such a gas shielded arc welding, a shield gas from the gas nozzle 48 is always present around an arc 69 and an arc atmosphere is created by the shielding gas around the arc 69.

If the pump 56 of an exhaust fume device, comprising an exhaust nozzle 54, a pipe 55, an exhaust fume suction pipe 56 and a pipe 57 is operated, a welding fume generated from the arc 69 is sucked togehter with the shielding gas 68, cleaned through a filter in the pump 56 and exhausted outside the welding workshop. When at this time the nitrogen oxide measuring device 61 and the suction pump 58 for gas collection are operated, a gas flowing through the pipe 57 is collected and sent to the nitrogen oxide measuring device 61. Since the fume suction nozzle 54 is passed, together with a welding fume, around the arc and sucks a shielding gas 68 creating an arc atmosphere, the gas flowing through the pipe 57 is collected at the pump 56 and cleaned for reuse as an arc atmosphere. As the arc atmosphere is sent to the nitrogen oxide measuring device 61, the nitrogen oxide measuring device 61 can measure the concentration of nitrogen oxide in the arc atmosphere to generate an electric signal. The concentration of nitrogen oxide representing the extent of shielding function of the arc atmosphere is indicated at the indicator 62 and recorded onto a recording medium. In this case, no particular gas collection device is provided and the fume exhaust device is used for this purpose, thus permitting a simple construction to be attained in the arc welding machine.

Figure 7:
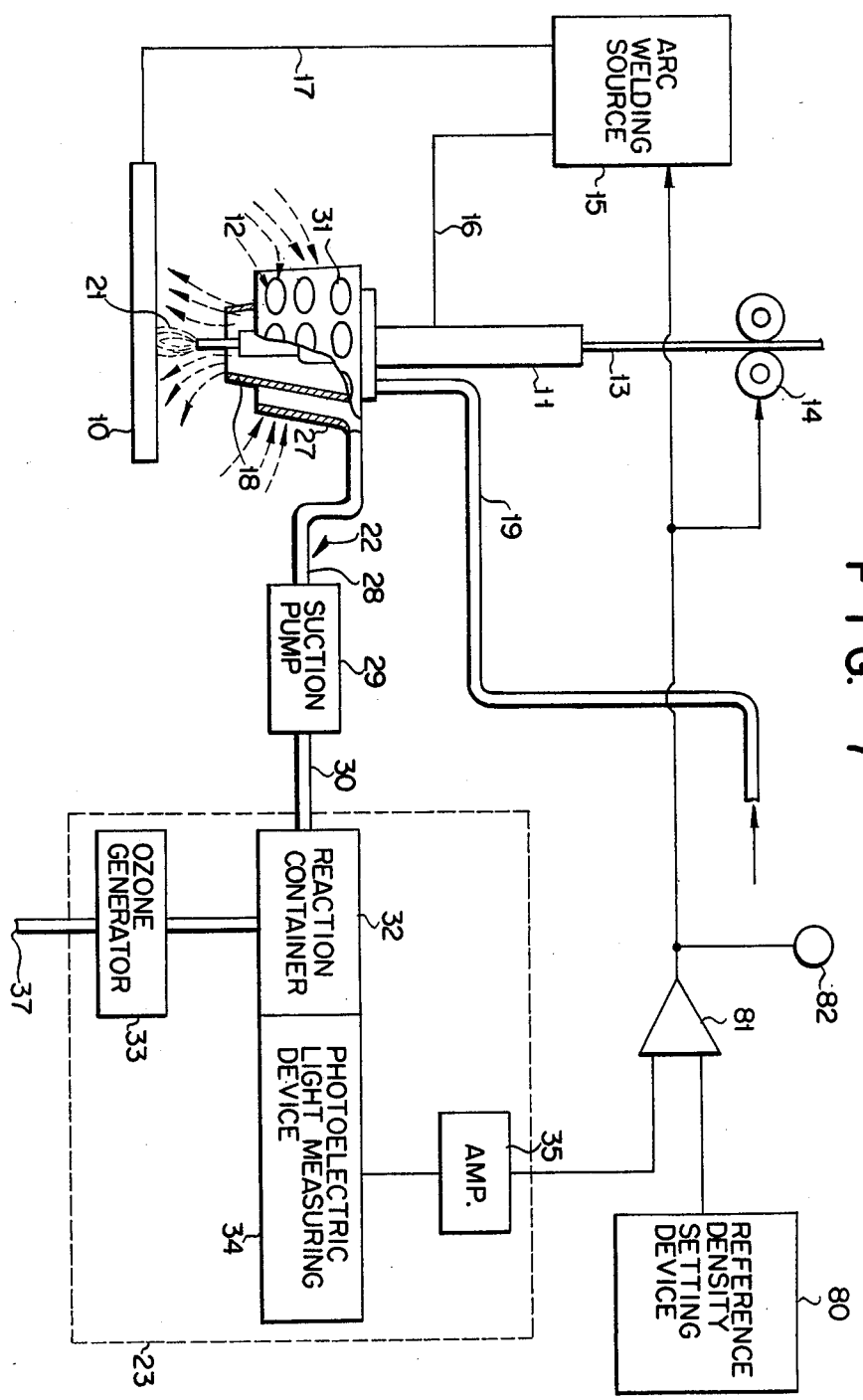
FIG. 7 is a block diagram showing the arc welding machine capable of automatically stopping a welding operation according to the extent of shielding function of an arc atmosphere.
Figure 8:
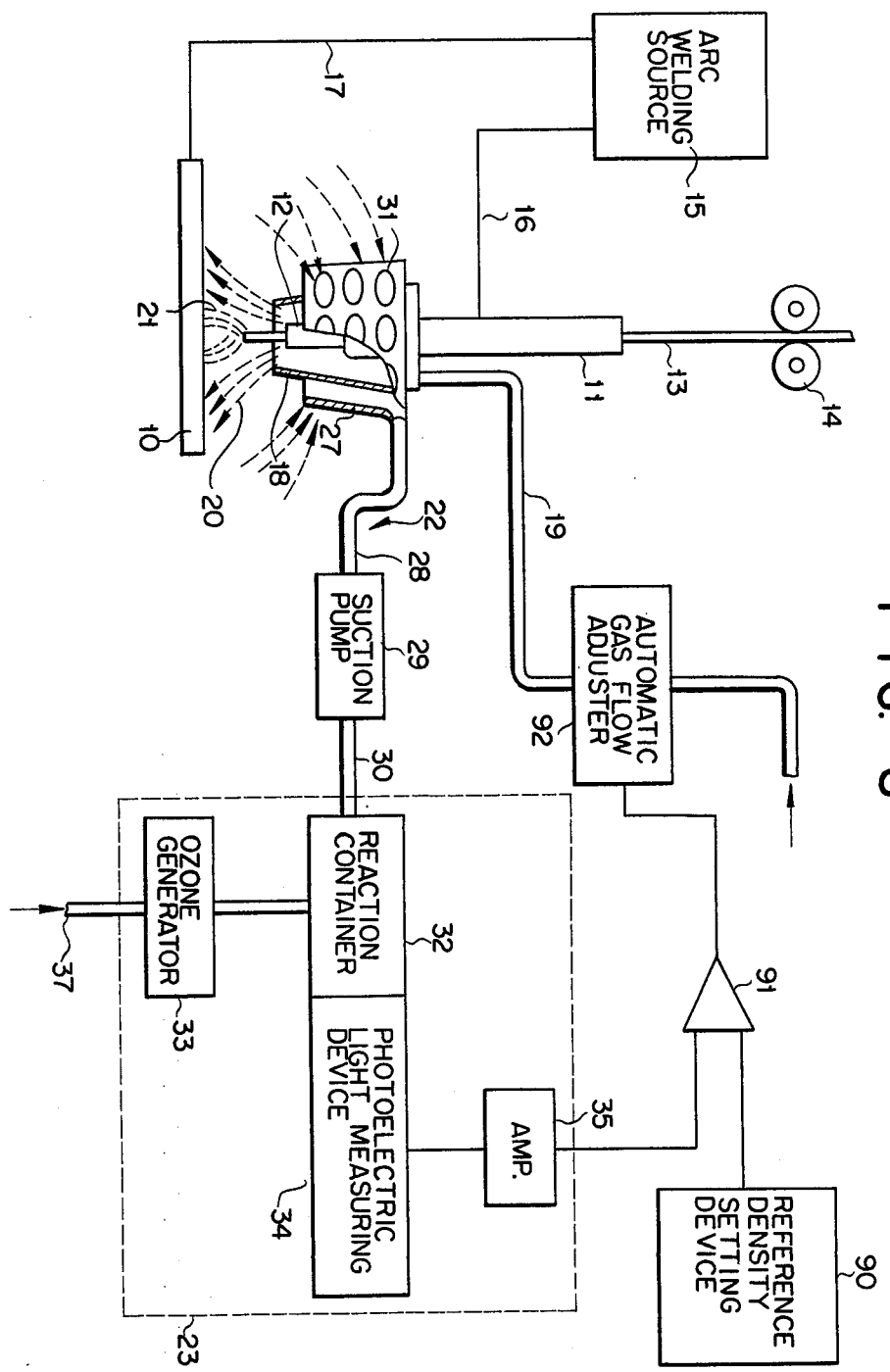
FIG. 8 is a block diagram showing the arc welding machine capable of automatically controlling a flow of shielding gas according to the extent of shielding function of an arc atmosphere.
Figure 9:
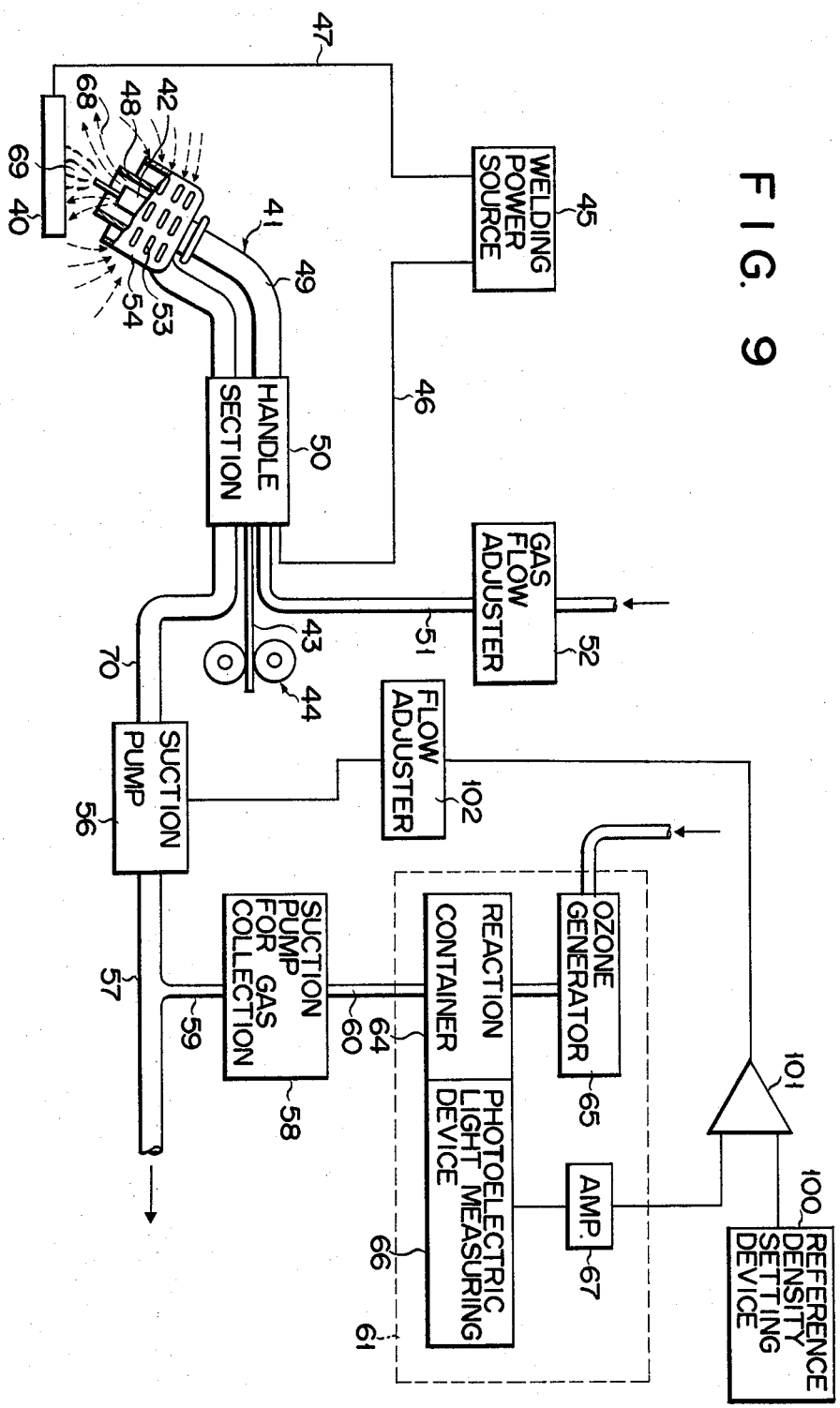
FIG. 9 is a block diagram showing the arc welding machine capable of automatically controlling a flow of exhaust fume through a fume exhaust device according to the extent of shielding function of an arc atmosphere.

Embodiments as shown in FIGS. 7 and 8 are similar in its basic structure in the embodiment shown in FIG. 5, while an embodiment as shown in FIG. 9 is similar in its basic structure to the embodiment shown in FIG. 6. In the embodiment shown in FIGS. 7, 8 and 9 similar reference numerals are employed to designate parts and elements corresponding to those shown in FIGS. 5 and 6 and any further explanation is omitted.

In the embodiment shown in FIG. 7 a reference output signal of a reference density setting device 80 and an output signal of a nitrogen oxide measuring device 23 are coupled to a differential amplifier 81 and when the output signal of the nitrogen oxide measuring device 23 exceeds the reference output signal, the differntial amplifier 81 generates an output. In this case, an alarm device such as a buzzer 82 is provided which is adapted to be energized and operated by the output signal of the differential amplifier. An arc welding power source 15 and a wire feed device 14 are controlled by the output signal of the differential amplifier 81 and stopped thereby. This is easily attained by, for example, providing at the power source circuit of the arc welding power source 15 and wire feed device 14 an interrupter adapted to be energized and opened by the output signal of the differential amplifier 81. When the concentration of nitrogen oxide in the atmosphere exceeds the reference level concentration preset at the reference density setting device 80, an output signal is generated from the differential amplifier 81, causing an alarm device to be operated. At the same time, the arc welding power source 15 and wire feed device 14 is stopped with the result that the arc welding operation is automatically stopped. If the reference level is set to the concentration of nitrogen oxide in the arc atmosphere which corresponding to the state when and a little before the shielding function of the arc atmosphere is lowered to the extent that a deposited metal suffers defects, the welding operation can be automatically stopped immediately when or immediately before the deposited metal suffers defects, a defective deposited metal per se can be prevented beforehand. In consequence, the deposited metal suffer no great amount of defects. The stopping of the welding operation can be immediately informed to the operator, since the alarm device is simultaneously operated. It is therefore possible to shorten a welding suspension time from a time at which the shielding function of the arc atmosphere is adjusted until the welding operation is restarted. It is also possible to operate the alarm device only by the output signal of the differential amplifier, while the arc welding power source 15 and wire feeding device 14 continues to be operated. In this case, the operator can be informed of the state a little before the shielding function is lowered to the extent that a deposited metal suffers defects. If, therefore, either the welding operation is manually stopped according to the alarm from the alarm device or the welding operation continues to be operated while the shielding function of the arc atmosphere is adjusted, it is possible to prevent a defective deposited metal as in the case of the embodiment shown in FIG. 7.

In FIG. 8, the reference output signal of a reference concentration setting device 90 and the output signal of a nitrogen oxide measuring device 23 are coupled to a differential amplifier 91. An automatic gas flow adjuster 92 is disposed at a location partway between a gas nozzle 27 and a gas supply source 14 and adapted to control a flow of gas according to the variation of a control signal supplied in a range exceeding a minimum flow of gas preset. As the automatic gas flow adjuster 92 use may be made of, for example, a flow adjusting valve adapted to be operated by a servo-motor which is rotated according to the control signal. The output signal of a differential amplifier 91 is coupled as a control signal to the differential amplifier 91. With a reference concentration representing the concentration of nitrogen oxide in the arc atmosphere which is involved a little before the shielding function of the arc atmosphere is lowered to the extent that a deposited metal suffers defects, a reference concentration setting device 90 is adapted to generate an output signal corresponding to this density. When in this case the shielding function of the arc atmosphere is lowered, due to a spatter deposited onto a nozzle 18, to the extent that a deposited metal undergoes defects, the concentration of nitrogen oxide in the arc atmosphere is increased thereby. When the reference concentration exceeds the concentration of nitrogen oxide in the arc atmosphere, since the output signal of the nitrogen oxide measuring device 23 exceeds the reference signal, the differential amplifier 91 generates a control output signal proportional to a difference between the output signal and the reference signal. The control output signal is applied to the automatic gas adjuster 92. In consequence, a flow of shielding gas through a pipe 19 is automatically increased according to the control output signal. By so doing a flow of shielding gas through the gas nozzle 18 is increased the extent of shielding function of an arc atmosphere can be automatically adjusted to a proper level. That is, the extent of shielding function of the arc atmosphere is detected by the concentration of nitrogen oxide in the arc atmosphere and a flow of shielding gas is controlled so that the extent of shielding function of the arc atmosphere can be maintained always to a proper level. As a result, an automatic arc welding can be effected without involving a defective deposited metal and it is possible to prevent consumption of a great amount of shielding gas.

In the embodiment shown in FIG. 9 the reference output signal of a reference concentration setting device 100 and output signal of a nitrogen oxide measuring device 61 are coupled to a differential amplifier 101. A flow adjuster 102 is provided on a suction pump 56 of an exhaust fume device 70 so as to control a flow of gas sucked. The flow adjuster 102 is adapted to operate a suction pump 56 at a maximum suction flow rate in the absence of a control signal and, when it receives an output signal as a control signal from the differential amplifier 101, decreasingly control a flow of sucked gas through the pump 56 in accordance with the variation of the control signal. As the flow adjuster 102 use may be made of, for example, a device of the type adapted to control the rotation speed of a drive motor in the suction pump 56 in accordance with the control signal. With a reference concentration representing the concentration of nitrogen oxide in the arc atmosphere is involved a little before the shielding function of the arc atmosphere is lowered to the extent that a deposited metal suffers defects, a reference concentration setting device 100 generates a reference output signal corresponding to this reference concentration. When in this case, for example, a spatter is deposited onto a gas nozzle 48 during the welding operation to cause disturbance of a balance between a flow of shielding gas through the gas nozzle 48 and a flow of gas sucked by an exhaust fume suction nozzle 54 in an exhaust fume device 70 so that the shielding function of the arc atmosphere is lowered, the concentration of nitrogen oxide in the arc atmosphere is increased. If the shielding function of the arc atmosphere is lowered to the state involved a little before a deposited metal is subjected to a defect, the concentration of nitrogen oxide in the arc atmosphere exceeds the reference concentration. In consequence, the output signal of the nitrogen oxide measuring device 61 exceeds the reference output signal of the reference concentration setting device to cause the difference amplifier 101 to generate an output signal. The output signal of the difference amplifier 101 is coupled as a control signal to the flow adjuster 102. For this reason, a flow of sucked gas through the pump is controlled in accordance with a control signal which is coupled as an input to the flow adjuster 102 to cause a flow of exhaust gas through the exhaust fume device 70 to be decreased so that the shielding function of the arc atmosphere is recovered to a proper level. When the arc atmosphere is disturbed by sucking a fume through the fume exhaust device 70 so that the shielding function of the arc atmosphere is lowered, the suction of the exhaust fume suction device 70 is automatically stopped so that the shielding function is maintained always to a proper level. Although in this case the suction of the welding fume might be lowered during the welding operation, the welding operation can be effected without involving a defective deposited metal.

Although in the embodiments as shown in FIGS. 5 to 9 the nitrogen oxide measuring device is based on a chemical light emitting method, the other nitrogen oxide measuring device can be used based on, for example, an NO analysis method, an $NO_2$ concentration measuring method, an NO + $NO_2$ analysis method, or all-nitrogen analysis method. The NO analysis method includes an infrared ray gas analysis method, and a correlation analysis method; the $NO_2$-concentration measuring method, an infrared absorbing method, a correlation analysis method and a constant potential electrolysis method; the NO + $NO_2$ analysis method a naphthylethyldiamine method (absorptiometric method), a constant potential electrolysis method, an ozone oxide heat analysis method and an oxygen oxidation method and the all-nitrogen analysis method a phenoldisulphonic acid method (absorptiometric method) and an ozone oxidation-ion electrode method.

In the embodiment shown in FIG. 6 the arc welding operation can be automatically stopped and alarmed as known in the embodiment shown in FIG. 7 and a flow of shielding gas can be automatically controlled as shown in the embodiment of FIG. 8.

What we claim is:

1. An arc welding method comprising the steps of:
   supplying a predetermined amount of shielding gas around a tip portion of a welding electrode to shield the welding arc from atmospheric gas;
   supplying arc welding power between said welding electrode and a mother metal to generate an arc therebetween;
   measuring the concentration of nitrogen oxide in an arc atmosphere which is created in an outer atmosphere around said arc; and
   controlling during welding said amount of said supplied shielding gas in response to the measured concentration of nitrogen oxide.

2. An arc welding method according to claim 1 further comprising generating an alarm signal when a measured value of the concentration of nitrogen oxide exceeds a predetermined value.

3. An arc welding method according to claim 1 wherein said controlling step comprises increasing the amount of shielding gas supplied around the tip portion of the welding electrode to increase the shielding effect responsive to the measured concentration of nitrogen oxide exceeding a predetermined value.

4. An arc welding apparatus comprising:
   means for feeding a welding wire having a tip portion toward a mother metal;
   means for supplying a predetermined amount of shielding gas around a tip portion of said welding wire to shield the welding arc from atmospheric gas;
   a welding power source for supplying arc welding power between said welding electrode and said mother metal to generate an arc therebetween;
   means for collecting an arc atmosphere which is created in an outer atmosphere around said arc;
   a nitrogen oxide measuring device for measuring the concentration of nitrogen oxide in said collected arc atmosphere; and
   means coupled to said measuring device for controlling, during welding, said amount of shielding gas as a function of the measured concentration of nitrogen oxide.

5. An arc welding apparatus according to claim 4 further comprising a recorder coupled to said measuring device for recording a measured value of the concentration of nitrogen oxide.

6. An arc welding apparatus according to claim 4 further comprising an alarm device for generating an alarm when a measured value of the concentration of nitrogen oxide exceeds a predetermined value.

7. An arc welding apparatus according to claim 4 further comprising means for stopping a welding operation when a measured value of the concentration of nitrogen oxide exceeds a predetermined reference level.

8. An arc welding apparatus according to claim 4 wherein said means for supplying comprises a gas passage for shielding gas; and said means for conrolling comprises a gas flow adjusting device mounted in said gas passage and being operable in response to a measured value of said concentration of nitrogen oxide for automatically controlling a flow of shielding gas.

9. An arc welding apparatus according to claim 4 wherein said means for collecting comprises a fume exhaust device for sucking out welding fumes during the welding operation; and said means for controlling comprises a gas flow adjusting device coupled to said fume exhaust device and to said measuring device for controlling the flow of fumes in said fume exhaust device as a function of a measured value of said concentration of nitrogen oxide.

10. An arc welding apparatus according to claim 4 wherein said collection device continuously collects an arc atmosphere and includes means for sending said collected arc atmosphere through said nitrogen oxide measuring device.

* * * * *